United States Patent
Tsukamoto

(10) Patent No.: US 9,007,470 B2
(45) Date of Patent: *Apr. 14, 2015

(54) APPARATUS HAVING IMAGE SHAKE CORRECTION FUNCTION AND METHOD OF CONTROLLING THE SAME

(71) Applicant: Canon Kabushiki Kaisha, Tokyo (JP)

(72) Inventor: Suguru Tsukamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 13/928,733

(22) Filed: Jun. 27, 2013

(65) Prior Publication Data
US 2013/0287381 A1    Oct. 31, 2013

Related U.S. Application Data

(63) Continuation of application No. 12/548,331, filed on Aug. 26, 2009, now Pat. No. 8,497,915.

(30) Foreign Application Priority Data

Aug. 29, 2008  (JP) ................................ 2008-222017

(51) Int. Cl.
*H04N 5/225* (2006.01)
*G03B 5/00* (2006.01)
*G03D 17/00* (2006.01)

(52) U.S. Cl.
CPC . *G03B 5/00* (2013.01); *G03D 17/00* (2013.01)

(58) Field of Classification Search
CPC .......... H04N 5/23248; H04N 5/23254; H04N 5/23258; H04N 5/23261; H04N 5/23264; H04N 5/23267; H04N 5/2328; G03B 5/00
USPC ............ 348/208.2, 208.99, 208.4; 396/52–55
See application file for complete search history.

(56) References Cited

U.S. PATENT DOCUMENTS

| | | | | |
|---|---|---|---|---|
| 5,649,237 | A * | 7/1997 | Okazaki | 396/55 |
| 6,233,009 | B1 * | 5/2001 | Morofuji et al. | 348/208.8 |
| 7,797,313 | B1 * | 9/2010 | Goyal et al. | 707/723 |
| 8,497,915 | B2 * | 7/2013 | Tsukamoto | 348/208.4 |
| 2007/0183762 | A1 * | 8/2007 | Washisu | 396/53 |
| 2008/0037970 | A1 * | 2/2008 | Saito et al. | 396/55 |

* cited by examiner

*Primary Examiner* — Nelson D. Hernández-Hernández

(74) *Attorney, Agent, or Firm* — Canon USA, Inc. IP Division

(57) ABSTRACT

An apparatus and a method of controlling the apparatus are provided that can realize high-accuracy correction of image shake due to shift shake. Rotation radiuses at a plurality of frequencies among the frequency components of the shift shake are obtained. Correction amount is determined based on a result of assigning a respective weight to the rotation radius at each of the plurality of the frequencies based on information regarding at least one of an angular velocity and acceleration.

24 Claims, 14 Drawing Sheets

| FIG. 7A |
| FIG. 7B |

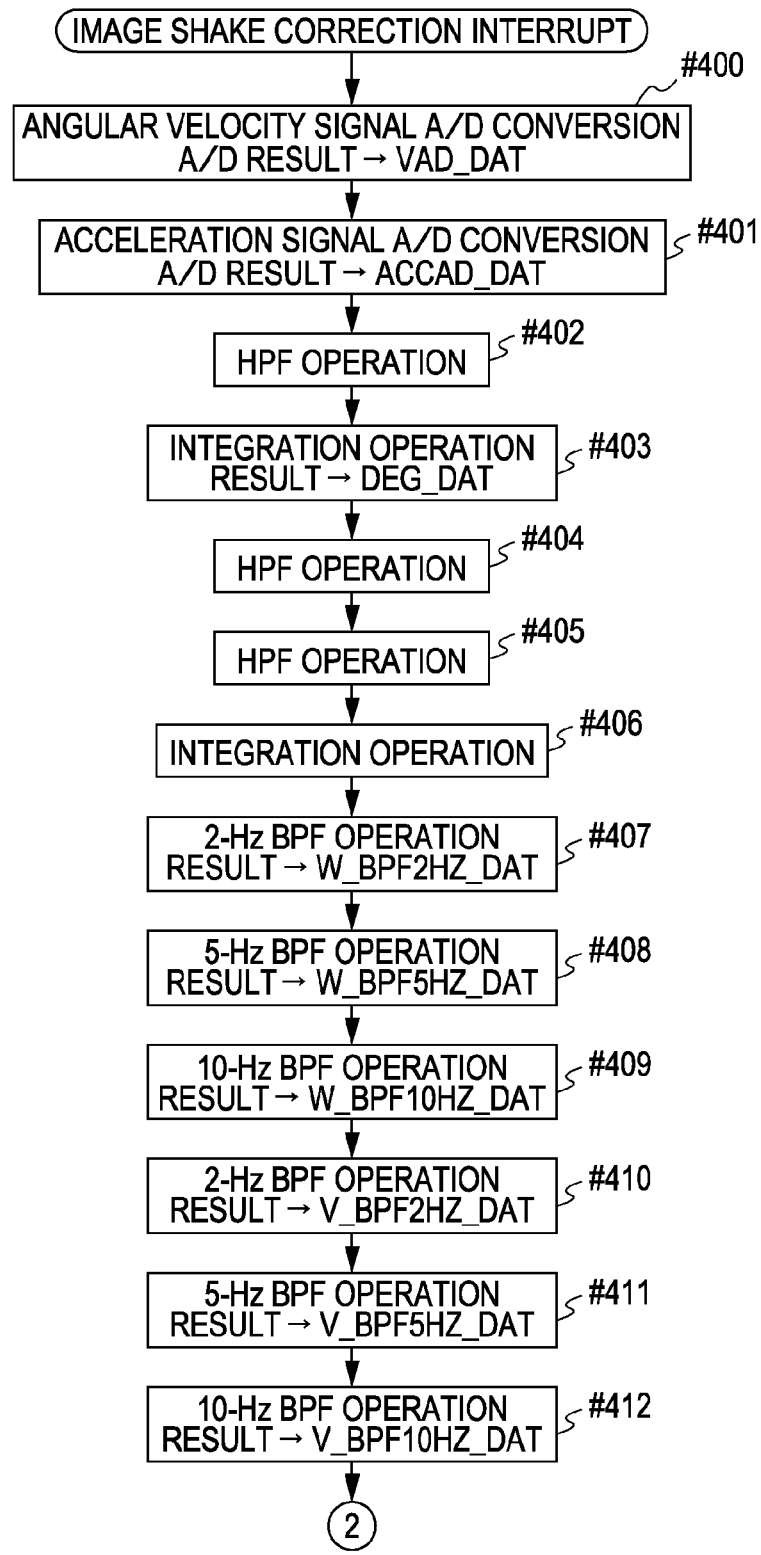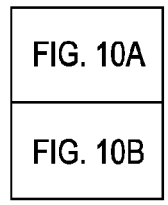

APPARATUS HAVING IMAGE SHAKE CORRECTION FUNCTION AND METHOD OF CONTROLLING THE SAME

CROSS-REFERENCE TO RELATED APPLICATIONS

This application is a continuation of application Ser. No. 12/548,331, filed on Aug. 26, 2009, which claims priority from Japanese Patent Application No. 2008-222017 filed Aug. 29, 2008, which are hereby incorporated by reference herein in their entirety.

BACKGROUND OF THE INVENTION

1. Field of the Invention

The present invention relates to an image stabilizing system. More particularly, the present invention relates to an optical apparatus having an image shake correction function, and a control method thereof.

2. Description of the Related Art

Shake acting on a photographic apparatus, such as a camera, often causes image shake and hence degradation of a captured image. Known technologies for reducing the influence of shake include a technology in which camera shake is detected using an angular velocity sensor, and by, for example, moving part of the lenses or shifting the position of a window used to cutout visible images from frames output from an image sensor, and image shake on the surface of the image sensor is reduced. Since angular shake that can be detected by using this technology using an angular velocity sensor has a significant adverse influence on a captured image under most photographing conditions, this technology is provided in various optical apparatuses as an effective image shake correction technology at present.

Under general photographing conditions, since angular shake is a dominant factor for the image shake, high accuracy image shake correction has been realized using the above-described technology. However, in short-distance photography (large-magnification-ratio photographing condition), there is non-negligible image degradation due to shift shake acting on a camera orthogonally relative to the optical axis of the camera, which cannot be detected by using only an angular velocity sensor. For instance, when photographing an object at a close distance of about 20 cm from a camera, or when photographing an object which is at a distance of as large as about 1 m from a camera but using a photographic lens having a very large focal length (for example, 400 mm), actively detecting and correcting for shift shake are performed.

Japanese Patent Laid-Open No. 7-225405 discloses a method in which, by providing an acceleration sensor that detects the acceleration of a camera body, an amount of shift shake is obtained from the second-order integral of the acceleration sensor output, and an amount of angular shake is obtained from the integral of a separately provided angular velocity sensor, whereby correction for shake is performed using a signal which is a combination of these two parameters. However, the output of the acceleration sensor is likely to be affected by a change in the environment such as disturbance noise and temperature especially in the frequency range of hand shake. The influence of these factors of instability is further increased by the second-order-integration operation, thereby making it difficult to realize high-accuracy correction for shift shake.

Japanese Patent Laid-Open No. 2005-114845 discloses a method in which the amount of shift shake is obtained by assuming it to be angular shake having a rotation center at a position away from the camera. This method corrects image shake by obtaining the rotation radius and the angle of the shake using the outputs of an angular velocity sensor and an acceleration sensor provided in the camera. This method allows computing of a rotation radius from the first-order integral of the acceleration sensor output and hence reduces the influence of the above-described factors of instability.

The method of obtaining shift shake using a rotation radius disclosed in Japanese Patent Laid-Open No. 7-225405 requires an accurate rotation radius to be obtained; however, camera shake usually has a plurality of frequency components and the rotation radius changes in accordance with the frequencies in many cases. Hence, it is difficult to realize accurate correction without obtaining the rotation radius corresponding to each of the frequency components. Use of only a rotation radius corresponding to one frequency component may cause the corrections for other frequency components to be inaccurate, whereby much image shake remains uncorrected.

The present invention provides high accuracy correction in an optical apparatus such as a camera having a function of correcting image shake due to shift shake, using an angular velocity sensor and an acceleration sensor, by realizing correction taking into account a plurality of frequency components included in shift shake.

SUMMARY OF THE INVENTION

According to an aspect of the present invention, an apparatus includes: a velocity detecting unit configured to detect an angular velocity of the apparatus, an acceleration detecting unit configured to detect acceleration of the apparatus, a determining unit configured to determine a correction amount to correct an image shake, and a correcting unit configured to correct the image shake based on the correction amount. The determining unit obtains a respective rotation radius of shake acting on the apparatus at each of a plurality of different frequencies and determines the correction amount based on a result of assigning a respective weight to the rotation radius at each of the plurality of the frequencies based on information regarding at least one of the angular velocity and the acceleration.

The determining unit can determine a velocity of the apparatus based on information regarding the acceleration, and obtain the respective rotation radius of the shake from a respective ratio of the angular velocity and the velocity at each of the plurality of the frequencies.

The determining unit can determine the correction amount based on a result of assigning weights to the respective rotation radiuses at the plurality of the frequencies such that a rotation radius for which there is a small phase difference between the angular velocity and the velocity is assigned a weight that is larger than that assigned to a rotation radius for which there is a large phase difference.

The determining unit can determine the correction amount based on a result of assigning weights to the respective rotation radiuses at the plurality of the frequencies such that a rotation radius corresponding to the angular velocity having a large amplitude is assigned a weight that is larger than that assigned to a rotation radius corresponding to the angular velocity having a small amplitude.

The determining unit can determine the correction amount based on a result of assigning weights to the respective rotation radiuses at the plurality of the frequencies such that a rotation radius corresponding to the velocity having a large amplitude is assigned a weight that is larger than that assigned to a rotation radius corresponding to the velocity having a small amplitude.

The determining unit can determine the respective rotation radius at each of the plurality of the frequencies based on a plurality of pairs of the angular velocities and the velocities.

The determining unit can obtain the rotation radius computed based on outputs that are obtained by extracting a plurality of different frequency components, using band extracting units, from outputs of the angular velocity and the acceleration detecting units.

According to another aspect of the present invention, a method of controlling an apparatus having an image shake correction function includes: detecting an angular velocity of the apparatus, detecting acceleration of the apparatus, obtaining a respective rotation radius of shake acting on the apparatus at each of a plurality of different frequencies, assigning a respective weight to the rotation radius at each of the plurality of the frequencies based on information regarding at least one of the angular velocity and the acceleration, and determining a correction amount to correct the image shake based on a result obtained by the weight assigning. Further features of the present invention will become apparent from the following description of exemplary embodiments with reference to the attached drawings.

DESCRIPTION OF THE EMBODIMENTS

Figure 1:
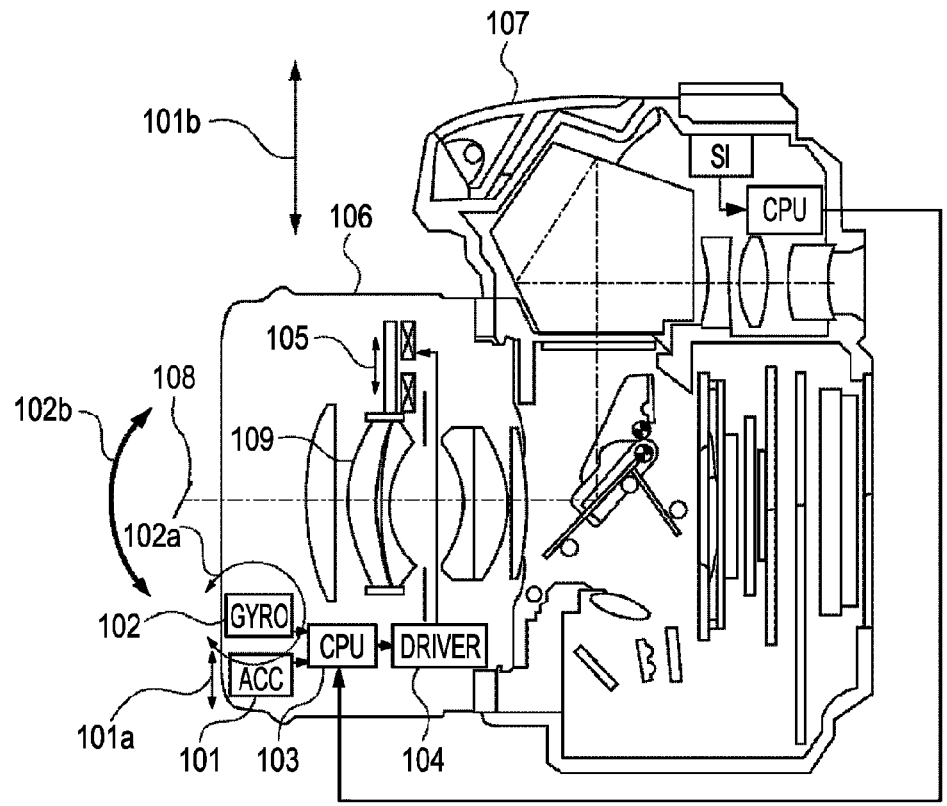
FIG. 1 is a sectional view of a single-lens reflex camera to which the present invention can be applied.

An example of an optical apparatus to which the present invention can be applied will be described. FIG. 1 shows a camera system including a camera body 107 and an interchangeable lens 106. An image stabilizer mounted on the interchangeable lens 106 performs image shake correction for shift shake Y and angular shake θ respectively denoted by arrows 101b and 102b with respect to an optical axis 108.

Referring to FIG. 1, reference numeral 101 denotes an acceleration sensor (acceleration detecting unit), and an arrow 101a denotes a direction of movement which is detected by the acceleration sensor 101. Reference numeral 102 denotes an angular velocity sensor (angular velocity detecting unit), and an arrow 102a denotes a direction of rotation detected by the angular velocity sensor 102. A lens CPU 103 functions as a correction amount determining unit that determines a correction amount to correct image shake. An actuator 104 and a coil 105 together function as an image shake correcting unit that performs image shake correction on the basis of the correction amount obtained by the correction amount determining unit. The outputs of the acceleration sensor 101 and the angular velocity sensor 102 are input to the lens CPU 103, and, after being subjected to computation performed thereby, are converted into an image shake correction target value for the coil 105. The output of the lens CPU 103 is input to the coil 105, via the actuator 104, and drives an image shake correction lens 109 to perform image shake correction.

The present embodiment employs an optical image stabilization method by which an image shake correction lens is moved in a plane perpendicular to the optical axis on the basis of a computed correction amount. However, not limited to optical image stabilization, the method of correction based on a correction amount may be a method such as the method disclosed in Japanese Patent Laid-Open No. 2008-048013. In other words, the present invention is also realizable by employing electronic stabilization that reduces the adverse influence of shake by shifting the position of a window used to cutout visible images from captured frames output from an image sensor or by employing a combination of the methods described above.

In FIG. 1, a configuration is shown only about camera shake that is generated in the vertical direction (pitch direction); however, an acceleration sensor and an angular velocity sensor are provided also for camera shake in the horizontal direction orthogonal to the optical axis of the camera (yaw direction) to perform image shake correction processing similarly to the pitch direction.

In the present embodiment, a configuration is described in which two acceleration sensors and two angular velocity sensors are provided; however, sensors with two detection axes may be used to detect movement in the pitch and yaw directions at the same time.

Figure 2:
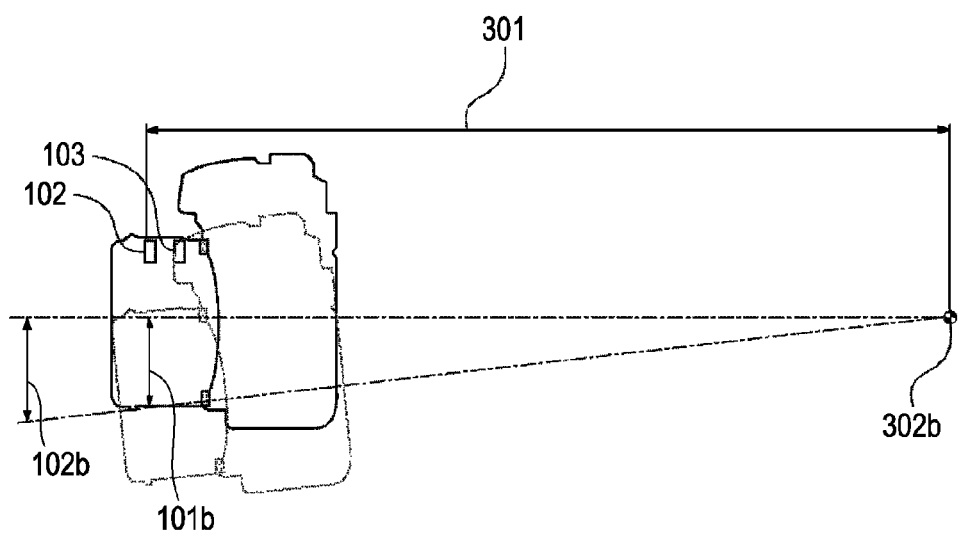
FIG. 2 is an illustration explaining a state of camera shake.

In the present embodiment, the amount of shift shake acting on a camera is obtained by assuming it to be angular shake having a rotation center at a position away from the camera. FIG. 2 shows a shift shake amount Y (101b) and an angular shake amount θ (102b) at the principal point of the photographic optical system. The relationship among the shift shake amount Y (101b), the angular shake amount θ (102b), and a rotation radius L (301) assuming a rotation center O (302b) is given by the following equations. Here, the rotation radius L (301) is a horizontal distance from the rotation center O (302b) to the acceleration sensor 101.

$$L = Y/\tan\theta \tag{1}$$

$$L = V/\tan\omega \tag{2}$$

In Equation (1), the rotation radius L (301) is obtained from the shift shake amount Y (101b), which is the second-order integral of the output of the acceleration sensor 101, and the angular shake amount θ (102b), which is the first-order integral of the output of the angular velocity sensor 102. In Equation (2), the rotation radius L (301) is obtained from the velocity V, which is the first-order integral of the acceleration sensor 101, and an angular velocity ω, which is the output of the angular velocity sensor 102. The rotation radius L (301) can be obtained using either equation (1) or (2).

Here, since the angle and angular velocity of the shake are small, Equations (1) and (2) can approximately be given by the following equations.

$$L = Y/\theta \tag{3}$$

$$L = V/\omega \tag{4}$$

In Equation (3), the rotation radius L is obtained from the shift shake amount Y, which is the second-order integral of the output of the acceleration sensor 101, and the angular shake amount θ, which is the first-order integral of the output of the angular velocity sensor 102. In Equation (4), the rotation radius L is obtained from the velocity V, which is the first-order integral of the acceleration sensor 101, and the angular velocity ω, which is the output of the angular velocity sensor 102. The rotation radius L can be obtained using either equation (3) or (4).

Here, an image shake amount δ generated in the image plane of a photographic optical system will be explained. The amount of image shake δ generated in the image plane is given by Equation (5) shown below, using the shift shake amount Y and angular shake amount θ at the principal point of the photographic optical system, and the focal length f and photographing magnification ratio β of the photographic optical system.

$$\delta = (1+\beta)f\theta + \beta Y \quad (5)$$

Here, the first term on the right hand side is the angular image shake component and the second term on the right hand side is the shift image shake component. Since the focal length f and the photographing magnification ratio β of the first term on the right hand side are obtained from the zooming and focusing information of the photographic optical system, and the angle θ is obtained from the integral of the angular velocity sensor, the correction for the angular shake can be performed in accordance with the information as shown in the block diagram of FIG. 2. In the second term on the right hand side, the shift image shake amount is obtained from the shift shake amount Y, which is the second-order integral of the acceleration sensor output, and the photographing magnification ratio β obtained from the zooming and focusing information of the photographic optical system.

In the embodiments of the present invention, however, image shake correction is performed for the image shake amount δ using Equation (6), which has been derived from Equation (5).

$$\delta = (1+\beta)f\theta + \beta L\theta \quad (6)$$

In other words, instead of using the shift shake amount Y obtained from the second-order integral of the acceleration sensor output, the shift shake amount is obtained by first obtaining the rotation radius L using Equation (4) and then using the rotation radius L, the angular shake amount θ, and the photographing magnification ratio β obtained from the zooming and focusing information of the photographic optical system.

As described above, in many cases, the shift shake contains a plurality of frequency components, and the rotation radiuses are different for different frequency components. Hence, in the present embodiments, the rotation radius is obtained for each of a plurality of the frequency components when determining the correction amount for correcting image shake due to shift shake. In the embodiments described below, the rotation radius is obtained for each of the three different frequencies, and the correction amount is determined by combining the obtained plurality of rotation radiuses.

When the rotation radiuses are to be combined, the reliability of each rotation radius is evaluated, and the rotation radiuses are combined on the basis of weights assigned in accordance with the evaluation results. Here assigning weights means that when a plurality of components are combined to produce a composite value, each component is multiplied by a coefficient according to a predetermined criterion before computation is performed. The evaluation of the reliability is performed on the basis of at least one of the angular velocity sensor output and the acceleration sensor output.

Hereinafter, embodiments are shown and described in detail.

In a first embodiment, the reliability of each rotation radius is evaluated on the basis of a phase difference between an angular velocity, which is the output of the angular velocity sensor 102, and a velocity obtained from the output of the acceleration sensor 101. In accordance with the evaluation results, weighted rotation radiuses are combined to produce a composite rotation radius, on the basis of which, a correction amount is determined.

Figure 3:
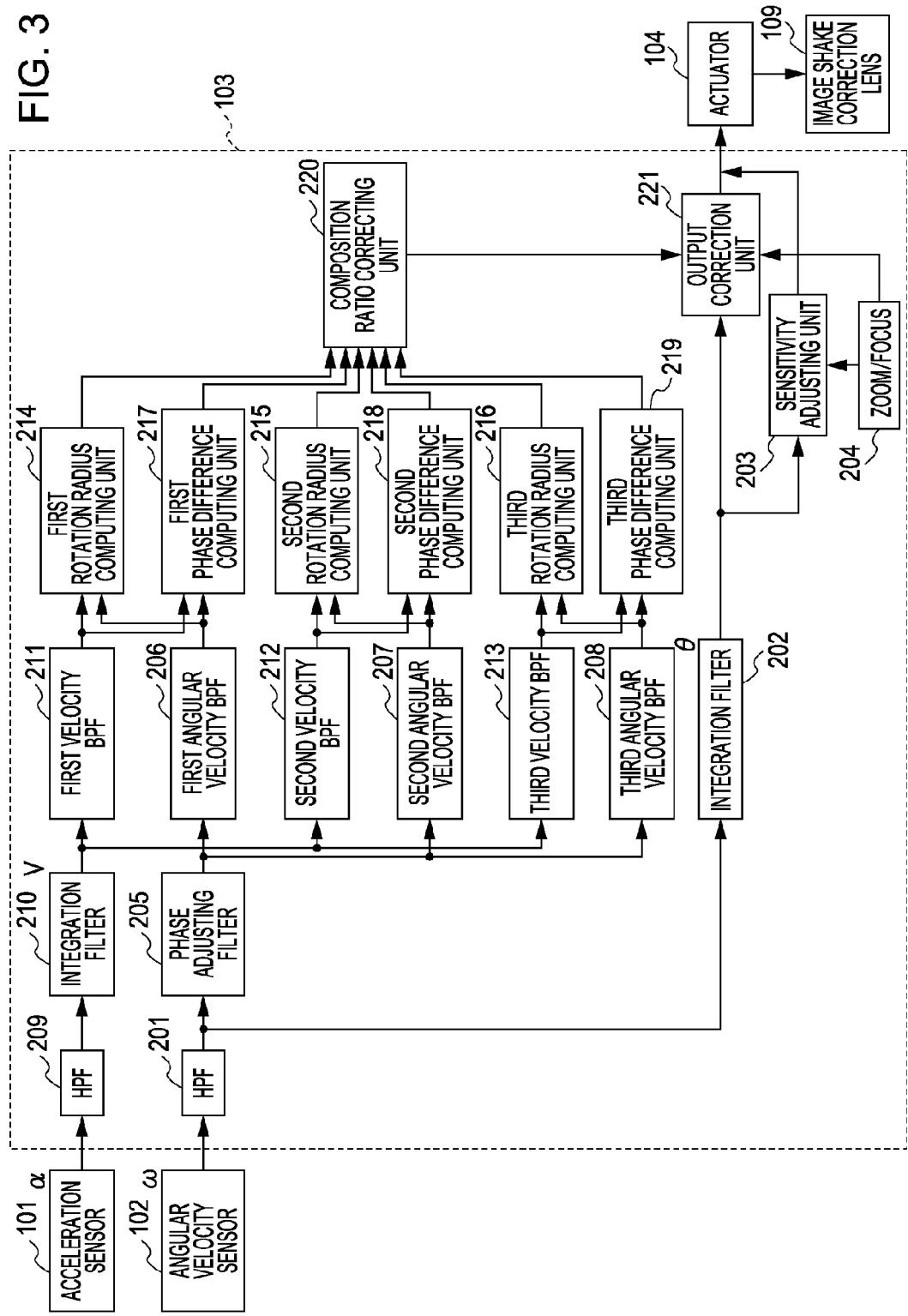
FIG. 3 is a block diagram of image shake correction processing according to a first embodiment of the present invention.

FIG. 3 shows a block diagram of an image stabilizer system that realizes the above-described determination of a correction amount and correction for shake. This block diagram shows a configuration that detects pitch-direction shake of a camera. Since a configuration for the yaw-direction is similar to this, only the configuration for the pitch direction will be described.

First, correction for angular shake, which is disclosed as a known technology, will be described. The output of the angular velocity sensor 102 is input to the lens CPU 103. The output of the lens CPU 103 is input to a high pass filter (hereinafter, called HPF) 201, where the direct current (DC) component thereof is cut off. The output of the HPF 201 is integrated by an integration filter 202 and converted into an angular output θ. Note that the HPF and integration filtering process is realized such that the lens CPU 103 performs arithmetic operations on the digitized output of the angular velocity sensor 102, using known difference equations, for example. Alternatively, an analog circuit including capacitors and resistors may be used to realize these operations before the output of the angular velocity sensor 102 is input to the lens CPU 103.

Here, the cut-off frequency of the HPF 201 and the integration filter 202 will be described. In general, the frequencies of shake range from 1 to 10 Hz, hence, the cut-off frequency is set so as to realize first-order filter characteristics that cut off frequencies of 0.1 Hz or less, which are much lower than the shake frequencies. The output of the integration filter 202 is input to a sensitivity adjusting unit 203. The sensitivity adjusting unit 203 adjusts the output of the integration filter 202 on the basis of zoom/focus output information 204 that is input to the lens CPU 103 from a zoom/focus encoder (not shown), to determine a target value for angular image shake correction. The reason why the sensitivity adjusting unit 203 performs adjustment is that as the optical state of a lens such as a zooming or focusing state changes, the sensitivity of image shake correction on a camera image plane to the image shake correction stroke of the coil 105 changes.

The output of the sensitivity adjusting unit 203, which is the target value for angular image shake correction, is output from the lens CPU 103 as a target value for image shake correction. The target value for image shake correction output from the lens CPU 103 is input to the coil 105 via the actuator 104, and drives the image shake correction lens 109 shown in FIG. 1 to perform image shake correction.

In the present invention, the output of the sensitivity adjusting unit 203, which is the target value for angular image shake correction, is added by the lens CPU 103 to the output of an output correcting unit 221 described later, which is the target value for shift image shake correction, and the sum of them is input to the actuator 104.

Next, a block for correction for shift shake will be described. The output of the angular velocity sensor 102 is input to the lens CPU 103. The output of the lens CPU 103 is input to the HPF 201, where the DC component thereof is cut off. The output of the HPF 201 is input to a phase adjusting filter 205, where phase adjustment is performed. The reason why the phase adjustment is performed by the phase adjusting filter 205 is to make the phase of the output match the phase of the output of an integration filter 210 described later. Since the cutoff frequency of the integration filter 210 is 0.1 Hz, the phase adjusting filter 205 is also made to have a cutoff frequency of 0.1 Hz. The output of the phase adjusting filter 205 is input to angular velocity band pass filters (hereinafter, called BPFs) 206 to 208, which are band pass filters functioning as band extracting units, where frequency components corresponding to the frequency bands of the respective filters are extracted and output. In the present embodiment, the lens CPU 103, which functions as correction amount determining unit, also functions as the band extracting units; however, analog BPFs or the like may be used as the band extracting units instead.

The output of the acceleration sensor 101 is input to an HPF 209, where the DC component thereof is cut off. The output of the HPF 209 is input to the integration filter 210, where the input is converted into a velocity. Here, the cutoff frequency of the HPF 209 is 0.1 Hz, which is the same as that of the HPF 201, and as described above, the cutoff frequency of the integration filter 210 is the same as that of the phase adjusting filter 205. The integration filter 210 is constituted of a low pass filter (hereinafter, called LPF). Since the phase adjusting filter 205 performs an HPF operation by subtracting an LPF operation output from the input, the output thereof has the same phase as the integration filter 210. The output of the integration filter 210 is input to velocity BPFs 211 to 213, where the frequency components set in the respective filters are output.

Here, the first angular velocity BPF 206 and the first velocity BPF 211 each output a signal having a peak at 2 Hz, the second angular velocity BPF 207 and the second velocity BPF 212 each output a signal having a peak at 5 Hz, and the third angular velocity BPF 208 and the third velocity BPF 213 each output a signal having a peak at 10 Hz.

The outputs of the first angular velocity BPF 206 and the first velocity BPF 211 are input to a first rotation radius computing unit 214. Similarly, the outputs of the second angular velocity BPF 207 and the second velocity BPF 212 are input to a second rotation radius computing unit 215. Further, the outputs of the third angular velocity BPF 208 and the third velocity BPF 213 are input to a third rotation radius computing unit 216. Respective rotation radiuses are computed using Equation (4).

The output of the first angular velocity BPF 206 and the output of the first velocity BPF 211 are input to a first phase difference computing unit 217. Similarly, the output of the second angular velocity BPF 207 and the output of the second velocity BPF 212 are input to a second phase difference computing unit 218. Further, the output of the third angular velocity BPF 208 and the output of the third velocity BPF 213 are input to a third phase difference computing unit 219. Thus, the phase differences of the respective velocities and angular velocities are computed. The method of computing the phase differences is described later.

Then, in a composition ratio correcting unit 220, the composition ratios of the outputs of the rotation radius computing units 214 to 216 are adjusted on the basis of the outputs of the phase difference computing units 217 to 219, and are output to the output correcting unit 221. The method of performing computing operations in the composition ratio correcting unit 220 is a feature of the present embodiment and will be described later.

In the output correcting unit 221, the shift shake amount Y is computed using Equation (3) from the angle θ, which is the output of the integration filter 202, and the rotation radius L, which is the output of the composition ratio correcting unit 220. Further, the shift shake amount Y is corrected on the basis of the output of the zoom/focus output information 204, to compute the shift image shake correction target value.

The shift image shake correction target value, which is the output of the output correcting unit 221, is added to the angular image shake correction target value, which is the output of the sensitivity adjusting unit 203, and the sum of them is output from the lens CPU 103 as an image shake correction target value. The output of the lens CPU 103 is input to the coil 105 via the actuator 104, and the image shake correction lens 109 is driven, thereby performing image shake correction.

Figure 4:
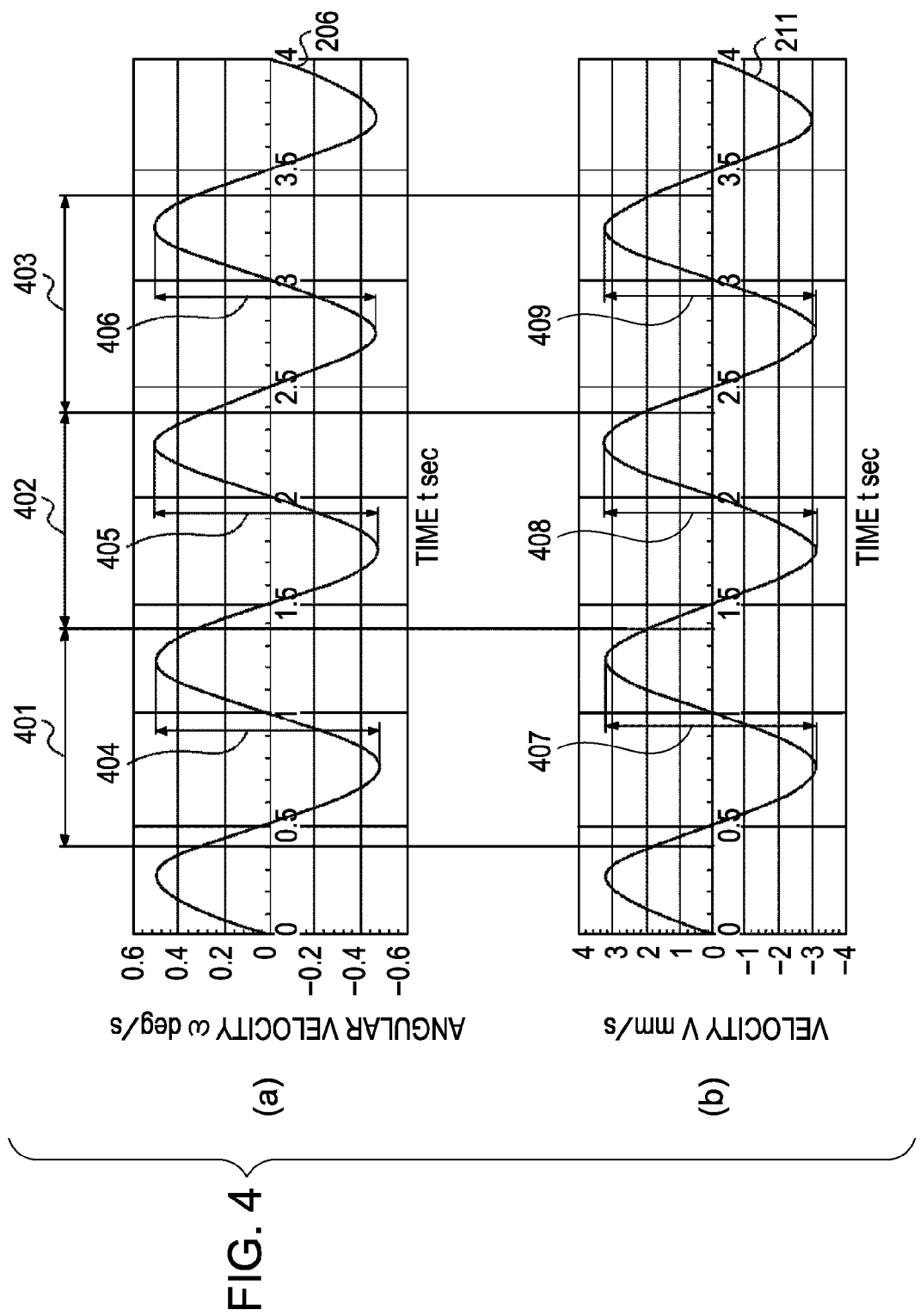
FIG. 4 is an illustration explaining a rotation radius computing unit for image shake correction.

The method of computing a rotation radius will now be explained. Referring to FIG. 4, the waveform (A) is an output waveform of the first angular velocity BPF 206 input to the first rotation radius computing unit 214. The waveform (B) shown in FIG. 4 is an output waveform of the first velocity BPF 211. Reference numerals 401 to 403 denote sampling intervals (shown by arrows). The displacement amounts (shown by arrows) of the first angular velocity BPF 206 output during the respective sampling intervals are denoted by 404 to 406, and the displacement amounts (shown by arrows) of the first velocity BPF 211 output during the respective sampling intervals are denoted by 407 to 409. The rotation radius L during the interval 401 is computed using the displacement amount 404 of the angular velocity ω, the displacement amount 407 of the velocity V, and Equation (4). Here, when the sign of the first angular velocity BPF 206 output and that of the first velocity BPF 211 output are different, i.e., when the directions of the shift shake and angular shake are opposite, the shift shake works to counteract the angular shake, and hence, the rotation radius L is computed as a value with a minus sign. Similar processing is performed during the sampling intervals 402 and 403. Here the sampling interval can be set at an interval of, for example, about 25 ms, which will not include more than one inflection point for the case of 10 Hz, which is the highest shake frequency to be detected.

The average of a sequence in time of the rotation radiuses L, computed in this manner for respective sampling intervals on the basis of the outputs of the velocity sensor and acceleration sensor, is output to the composition ratio correcting unit 220. The reason for using the average of a sequence in time of the rotation radiuses L is to prevent reduction in computation accuracy due to an abrupt change in amplitude. Similar processing is performed by the second rotation radius computing unit 215 and the third rotation radius computing unit 216 to obtain the rotation radiuses to be output to the composition ratio correcting unit 220.

Figure 5:
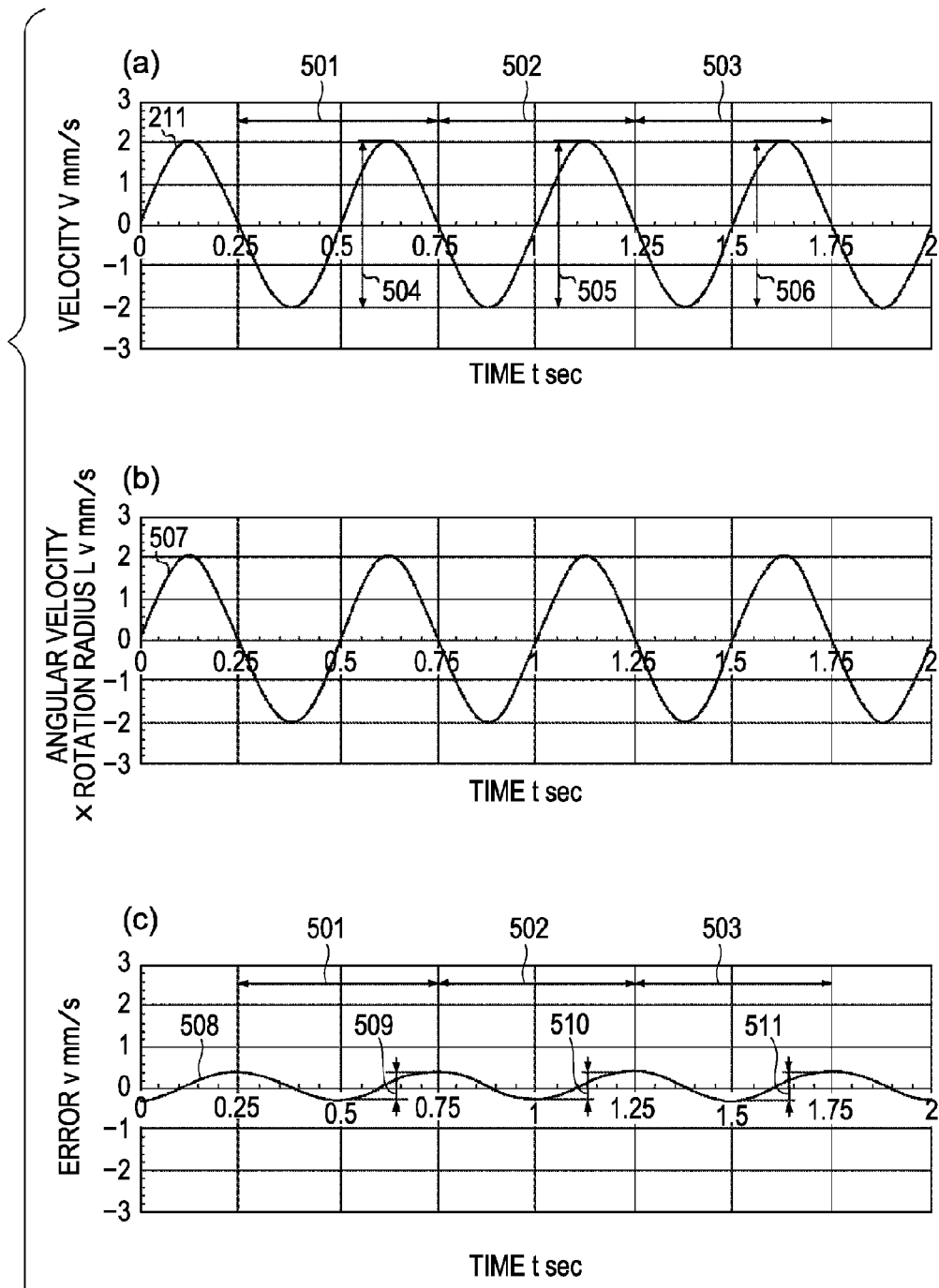
FIG. 5 is an illustration explaining a phase difference computing unit for image shake correction.

The method of computing a phase difference will now be explained. Referring to FIG. 5, the waveform (A) is the output waveform of the first velocity BPF 211 input to the first phase difference computing unit 217. The waveform (B) shown in FIG. 5 is a waveform 507 of the first angular velocity BPF 206 output multiplied by the rotation radius L obtained by the first rotation radius computing unit 214. The waveform (C) shown in FIG. 5 is a waveform 508 of the difference between the first velocity BPF 211 output and the waveform 507. Since a signal of the rotation radius L multiplied by the angular velocity ω is the velocity V as can be seen from Equation (4), the waveform 507 and the waveform of the first velocity BPF 211 output have the same dimensions.

In addition, since the rotation radius L is obtained using the method explained with reference to FIG. 4 the waveform 507 should have approximately the same amplitude as the first velocity BPF 211 output. However, the first velocity BPF 211 output may have a phase different from that of the waveform 507. In the first phase difference computing unit 217, the first velocity BPF 211 output and the waveform 508 are sampled at fixed intervals, and the phase difference between the angular velocity ω and velocity V is computed using the ratios of the displacement amounts during respective intervals. Reference numerals 501 to 503 denote sampling intervals (shown by arrows), and the displacement amounts (shown by arrows) of the first velocity BPF 211 output and those of the waveform 508 during these intervals are respectively denoted by 504 to 506 and 509 to 511. Here, the sampling interval can be made to be the same as that used in the rotation radius computation.

The average of a predetermined number of the phase difference amounts thus obtained is output to the composition ratio correcting unit 220. The reason for using the average is to prevent reduction in computation accuracy due to an abrupt change in amplitude or phase, similarly to the above described computation of rotation radiuses. Similar processing is performed by the second phase difference computing unit 218 and the third phase difference computing unit 219 to obtain the phase differences to be output to the composition ratio correcting unit 220.

The processing performed by the composition ratio correcting unit 220 will now be described. In the composition ratio correcting unit 220, a larger composition weight is assigned to a rotation radius obtained from a frequency for which there is a smaller phase difference between the angular velocity ω and velocity V output from the phase difference computing units 217 to 219. The reason why a larger composition weight is assigned to a smaller phase difference will be explained with reference to FIG. 5. When the rotation center of shake is fixed at one position, the first velocity BPF 211 output matches the waveform 507. However, when there are a plurality of rotation centers and the acceleration sensor detects composite shake on the basis of these rotation centers, the phase of a velocity signal and that of an angular velocity signal are different in accordance with the size of shake resulting from the respective rotation centers. In other words, the smaller the phase difference of a frequency is, the higher the reliability of an obtained rotation radius is. Hence, the composition ratio correcting unit 220 assigns a larger weight to a rotation radius of a frequency for which there is a smaller phase difference, thereby increasing the correction accuracy of the amount of the shift image shake correction determined by the output correcting unit 221. Further, since the velocity V and angular velocity ω are subjected to a band pass filtering operation before computation of the rotation radius in the present embodiment, the influence of drift that has an adverse influence on the low frequency components of the output of the acceleration sensor is decreased.

Figure 6:
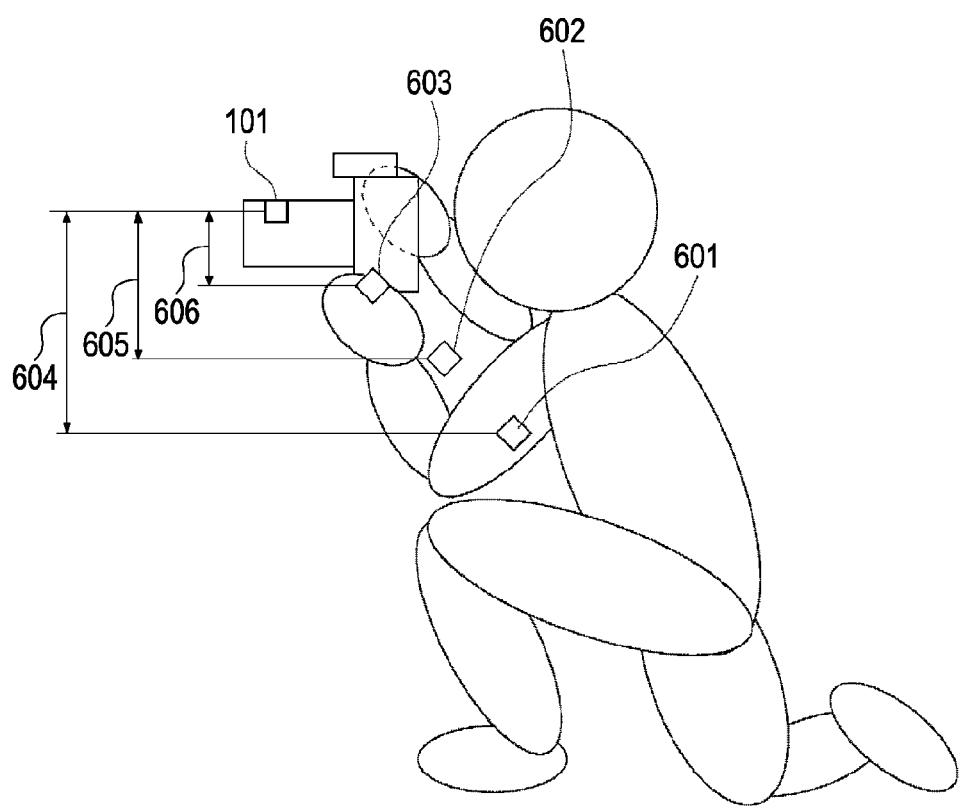
FIG. 6 is an illustration explaining a composition ratio correcting unit for image shake correction.

The method of adjusting the composition ratio of rotation radiuses performed by the composition ratio correcting unit 220 will now be described with reference to FIG. 6. FIG. 6 shows an illustration of shake for when a person is holding a camera. Reference numerals 601 to 603 respectively denote the rotation centers of 2 Hz, 5 Hz, and 10 Hz. Reference numerals 604 to 606 respectively denote rotation radiuses in the pitch direction, which are the distances from the acceleration sensor 101 provided at the position of the principal point of the lens to the positions of the rotation centers 601 to 603.

Here, let the rotation radiuses 604 to 606 for 2 Hz, 5 Hz, and 10 Hz be respectively L1, L2, and L3, and phase differences between the angular velocities and velocities be respectively θ1, θ2, and θ3. Then the composition ratio correcting unit 220 computes a rotation radius for correction using the following equation.

$$L = \frac{L1(\theta 2 + \theta 3) + L2(\theta 1 + \theta 3) + L3(\theta 1 + \theta 2)}{2(\theta 1 + \theta 2 + \theta 3)} \quad (7)$$

In Equation (7), the smaller the phase difference a frequency has, the larger a coefficient or weight assigned to the rotation radius corresponding to the frequency is.

Figures 7, 7A:
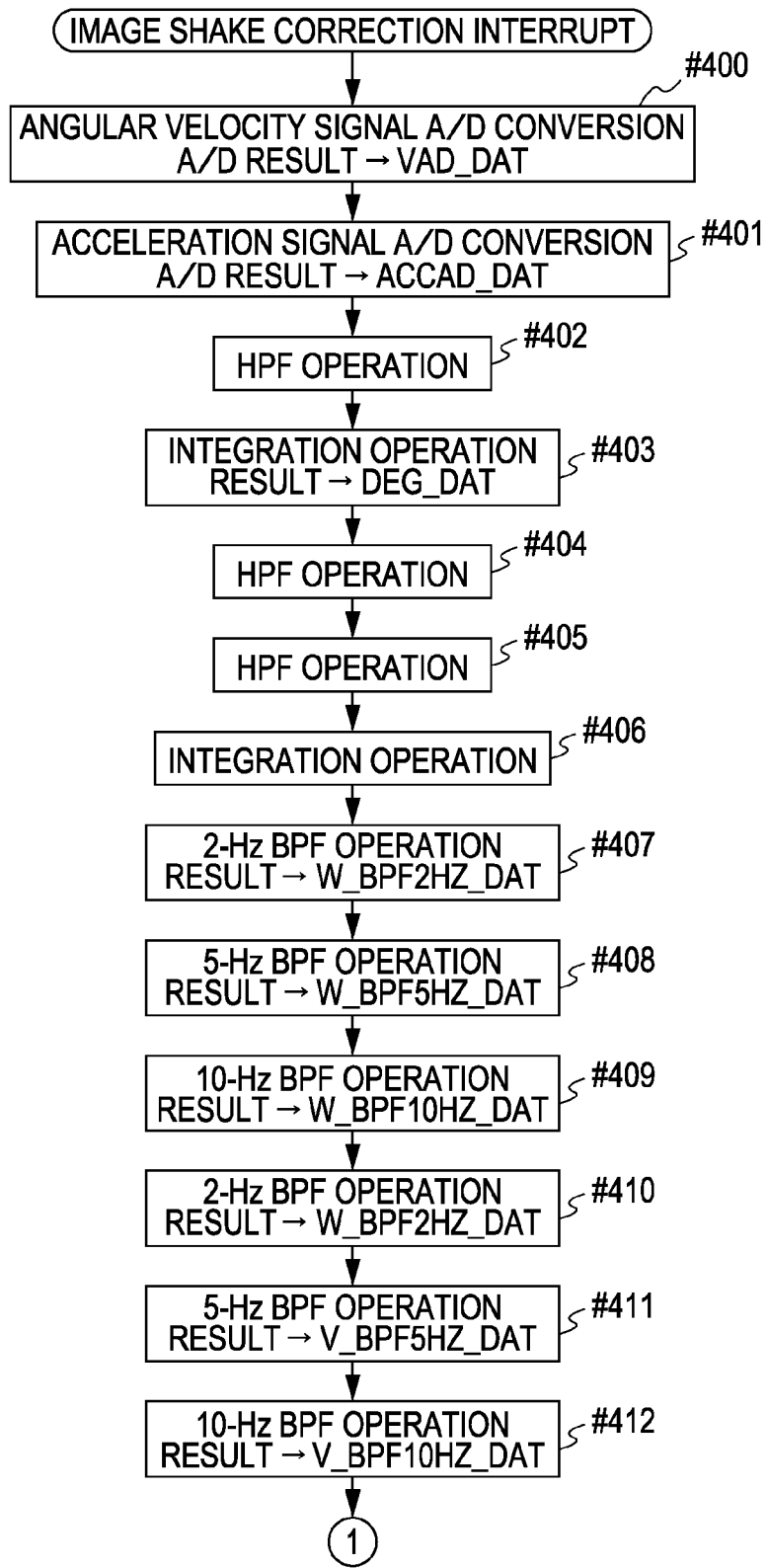
FIG. 7 is a flowchart for image shake correction.
Figure 7B:
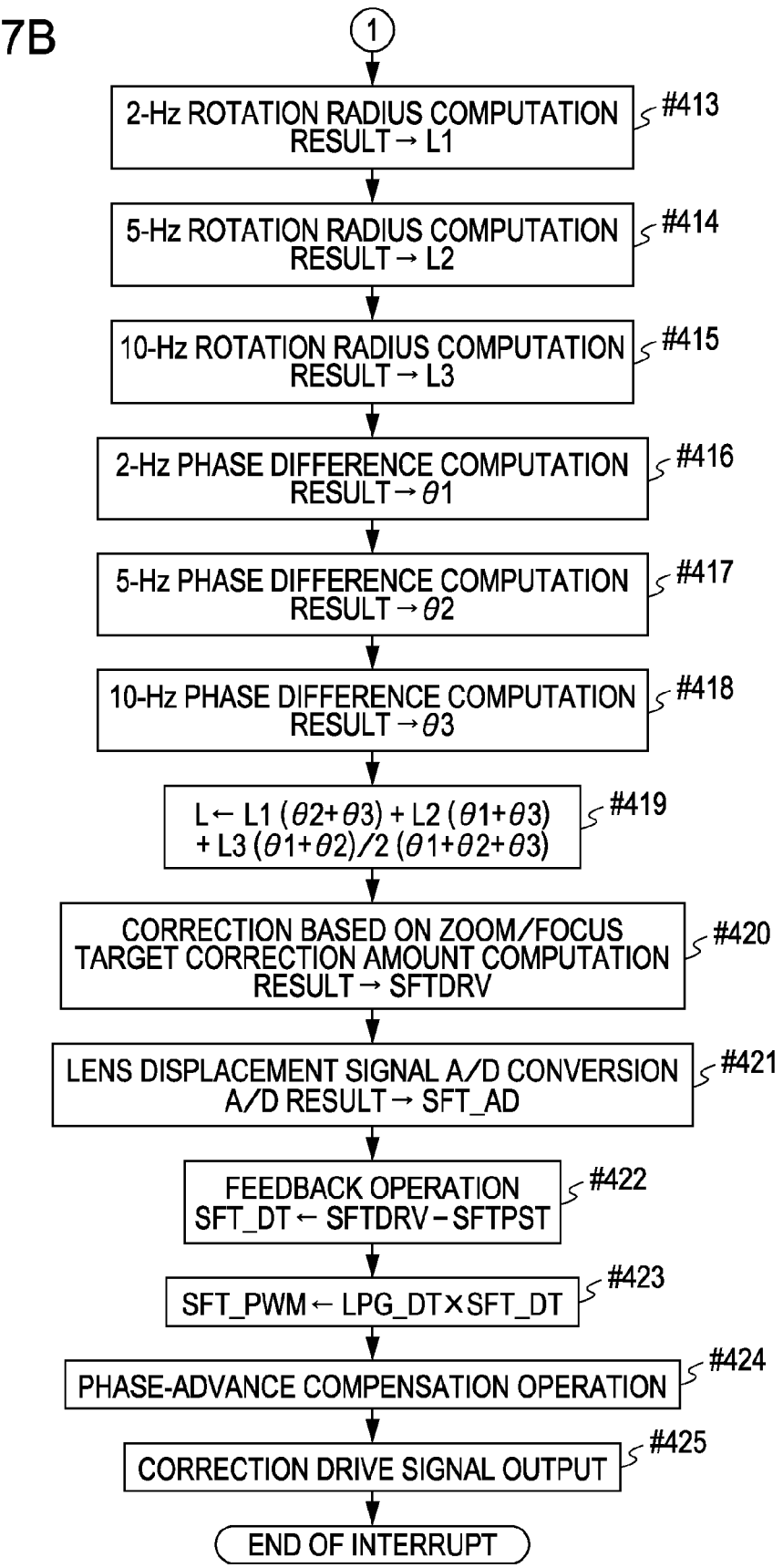

The image shake correction processing performed in the present embodiment will now be explained with reference to the flowchart shown in FIG. 7. The image shake correction processing is performed by timer interrupt processing which occurs at fixed intervals. In the present embodiment, step #400 functions as an angular velocity detecting step, step #401 functions as an acceleration detecting step, step #406 functions as a velocity obtaining step, and steps #407 to #412 function as a band extracting step. Steps #413 to #415 function as a rotation radius obtaining step, steps #416 to #419 functions as a weight assigning step, and step #420 functions as a determining step.

In step #400, the signal of the angular velocity sensor 102 is A/D converted, and the A/D converted result is stored as VAD_DAT in an area of RAM (not shown) set therefor.

In step #401, the signal of the acceleration sensor 101 is A/D converted, and the A/D converted result is stored as ACCAD_DAT in an area of RAM (not shown) set therefor.

In step #402, the HPF 201 performs a computational operation on the signal VAD_DAT of the angular velocity sensor 102 as an input.

In step #403, the integration filter 202 performs integration operation on the computation result of step #402 as an input. The integral result is stored as DEG_DAT in an area of RAM (not shown) set therefor. DEG_DAT is a shake angular displacement signal.

In step #404, the phase adjusting filter 205 performs phase adjustment operation on the computation result of step #402 as an input. This operation is performed to realize phase matching with signal processing (HPF and integration) performed later by the acceleration sensor 101.

In step #405, the HPF 209 performs filtering operation on ACC_DAT as an input.

In step #406, the integration filter 210 performs integration operation on the computation result of step #405 as an input. The operation result is a signal representing the velocity V of shift shake.

In step #407, the first angular velocity BPF 206 having a peak transmittance at 2 Hz performs a filtering operation on the operation result of step #404 as an input. The result is stored as W_BPF2HZ_DAT in an area of ROM (not shown) set therefor.

In step #408, the second angular velocity BPF 207 having a peak transmittance at 5 Hz performs a filtering operation on the operation result of step #404 as an input. The result is stored as W_BPF5HZ_DAT in an area of ROM (not shown) set therefor.

In step #409, the third angular velocity BPF 208 having a peak transmittance at 10 Hz performs a filtering operation on the operation result of step #404 as an input. The result is stored as W_BPF10HZ_DAT in an area of ROM (not shown) set therefor.

In step #410, the first velocity BPF 211 having a peak transmittance at 2 Hz performs a filtering operation on the computation result of step #406 as an input. The result is stored as V_BPF2HZ_DAT in an area of ROM (not shown) set therefor.

In step #411, the second velocity BPF 212 having a peak transmittance at 5 Hz performs a filtering operation on the computation result of step #406 as an input. The result is stored as V_BPF5HZ_DAT in an area of ROM (not shown) set therefor.

In step #412, the third velocity BPF 213 having a peak transmittance at 10 Hz performs a filtering operation on the operation result of step #406 as an input. The result is stored as V_BPF10HZ_DAT in an area of ROM (not shown) set therefor.

In step #413, W_BPF2HZ_DAT and V_BPF2HZ_DAT are used to obtain rotation radius L 2 Hz.

In step #414, W_BPF5HZ_DAT and V_BPF5HZ_DAT are used to obtain rotation radius L_5 Hz.

In step #415, W_BPF10HZ_DAT and V_BPF10HZ_DAT are used to obtain rotation radius L 10 Hz.

In step #416, W_BPF2HZ_DAT and the product of V_BPF2HZ_DAT and the rotation radius L1 at 2 Hz are compared to compute the phase difference θ1 corresponding to the filter pass band (2 Hz).

In step #417, WBPF5 HZ_DAT and the product of V_BPF5HZ_DAT and the rotation radius L2 at 5 Hz are compared to compute the phase difference θ2 corresponding to the filter pass band (5 Hz).

In step #418, W_BPF10HZ_DAT and the product of V_BPF10HZ_DAT and the rotation radius L3 at 10 Hz are compared to compute the phase difference θ3 corresponding to the filter pass band (10 Hz).

In step #419, the rotation radius L is obtained (Equation (7)), which is computed by assigning a larger weight to a frequency for which there is a smaller phase difference.

In step #420, the following computation is performed to determine a correction amount from the photographing magnification ratio β computed from the position information of the zoom/focus output information 204, the focal length f, the shake angle displacement DEG_DAT computed in step #403, and an optical image stabilization sensitivity correction factor α. The computed result is stored as SFTDRV in an area of ROM (not shown) set therefor.

$$\alpha\{(1+\beta) \times f \times DEG\_DAT + \beta \times L \times DEG\_DAT\}$$

In step 421, the displacement signal of the image shake correction lens is A/D converted, and the A/D converted result is stored as SFTPST in an area of ROM (not shown) set therefor.

In step #422, a feedback operation is performed (SFTDRV_SFTPST), and the computation result is stored as SFT_DT in an area of ROM (not shown) set therefor.

In step #423, loop gain LPG_DT is multiplied by SFT_DT, and the computation result is stored as SFT_PWM in an area of ROM (not shown) set therefor.

In step #424, a phase compensation operation is performed to realize a stable control system.

In step #425, the computation result obtained in step #423 is output to the actuator 104 as an image correction drive signal to perform image shake correction.

As described above, in the present embodiment, the rotation radius L is obtained (Equation (7)), which is computed by assigning a larger weight to a frequency for which there is a smaller phase difference between the angular velocity and velocity, in step #419, and a correction amount is determined on the basis of the obtained rotation radius L. This allows for more appropriate shift image shake correction. The equation for weighting is not limited to Equation (7), and any equation may be used which assigns a larger weight to a rotation radius corresponding to a frequency for which there is a smaller phase difference.

In the present embodiment, a composite rotation radius is obtained by using rotation radiuses at three different frequencies; however, the present embodiment can of course be applied to cases in which at least two rotation radiuses at two different frequencies are obtained.

In the present embodiment, different from the other embodiments, by using the phase difference between an angular velocity and a velocity as an evaluation index, the reliability of rotation radiuses can be evaluated from the viewpoint of the degree of variation in the rotation centers.

A second embodiment of the present invention will now be described. For simplicity, components that are the same as those of the first embodiment are denoted by the same reference numerals, the explanation thereof being omitted, and only portions specific to the present embodiment will be explained.

Figure 8:
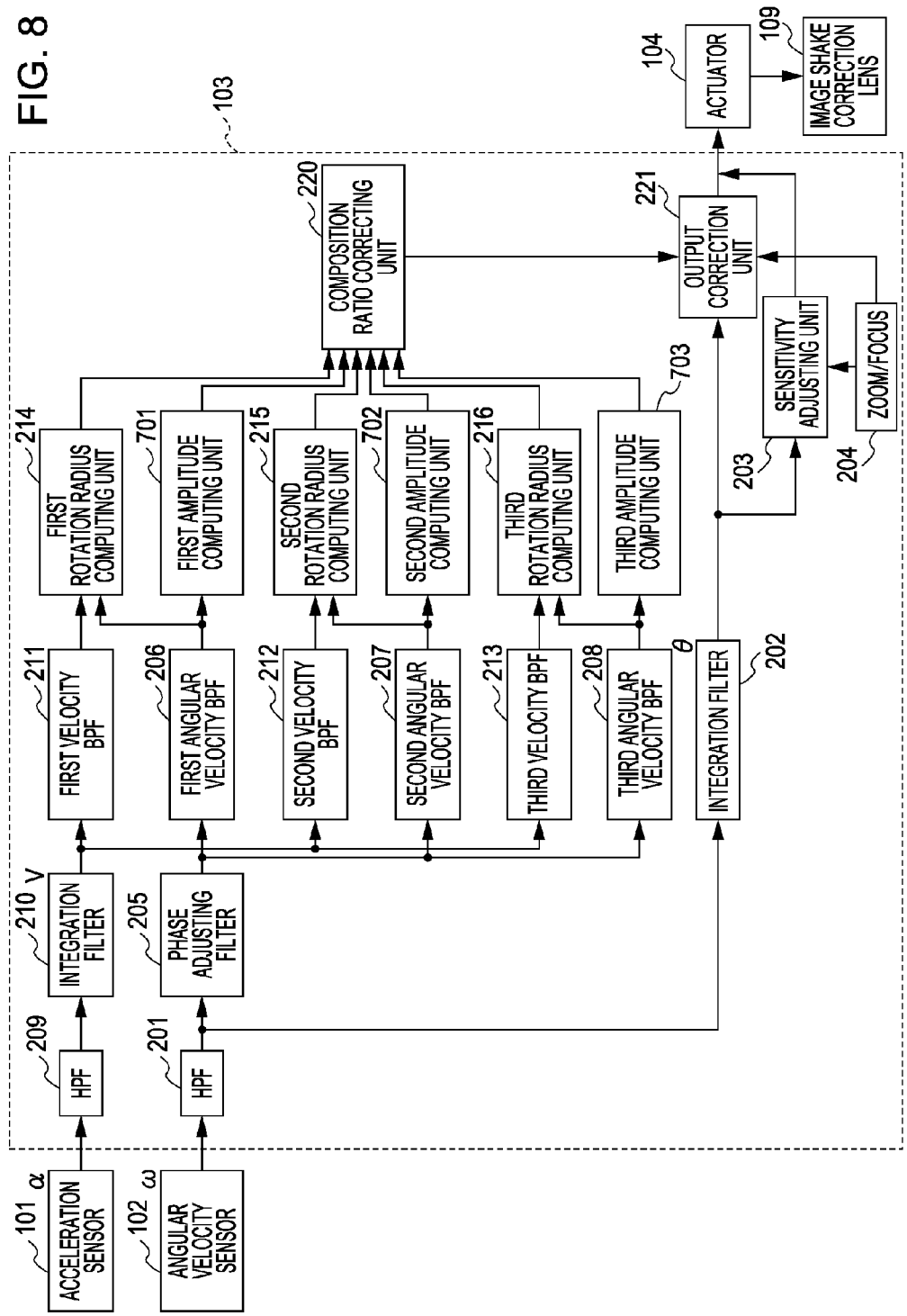
FIG. 8 is a block diagram for image shake correction.

The mechanical structure and hardware configuration of a camera in the present embodiment are the same as those in the first embodiment. FIG. 8 shows a block diagram according to the second embodiment of the present embodiment. The differences between the block diagrams shown in FIG. 2 and FIG. 8 are as follows.

(1) The phase difference computing units 217 to 219 have been replaced with amplitude computing units 701 to 703, which compute the amplitudes of the angular velocity sensor 102. In other words, in the second embodiment, composition of a rotation radius is performed on the basis of the outputs of a first amplitude computing unit and a second amplitude computing unit for at least two frequencies (first and second frequencies) to determine a correction amount.

(2) In the processing performed by the composition ratio correcting unit 220 in the first embodiment, a larger composition weight is assigned to a rotation radius for which there is a smaller phase difference; however, in the present embodiment, a larger composition weight is assigned to a rotation radius corresponding to an angular velocity having a larger amplitude.

First, the reason for using angular velocity amplitudes to adjust the rotation radius composition ratio will be described. A rotation radius is computed using Equation (4). As can be seen from Equation (4), the rotation radius is inversely proportional to an angular velocity. Hence, when the angular velocity is in the vicinity of zero, the value of the rotation radius is significantly increased. Considering that the rotation center of usual shake is likely to be in the vicinity of the body of a photographer, the value computed in this case is thought to have low reliability.

On the basis of what has been described above, a larger weight is assigned to a rotation radius corresponding to a larger angular velocity amplitude in the present embodiment.

Figure 9:
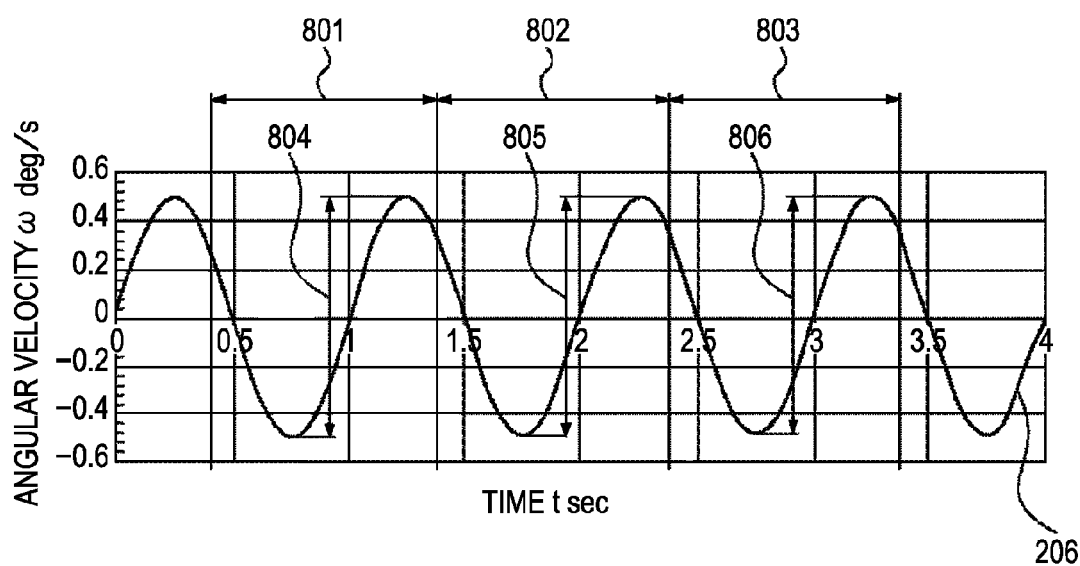
FIG. 9 is an illustration explaining an amplitude computing unit for image shake correction.

The method of computing amplitudes will be described with reference to FIGS. 8 and 9. FIG. 9 shows the output waveform of the first angular velocity BPF 206 input to the first amplitude computing unit 701. Reference numerals 801 to 803 denote sampling intervals (shown by arrows), and the displacement amounts (shown by arrows) of the first angular velocity BPF 206 during respective intervals are denoted by 804 to 806.

The average of a predetermined number of the angular velocity amplitudes thus obtained at sampling intervals is output to the composition ratio correcting unit 220. Here the sampling interval can be made to be the same as that for the rotation radius computing unit. Similar processing is performed by the second amplitude computing unit 702 and the third amplitude computing unit 703 to obtain respective amplitudes to be output to the composition ratio correcting unit 220.

The method of adjusting the composition ratio of rotation radiuses performed by the composition ratio correcting unit 220 will now be described with reference to FIG. 6. Let the rotation radiuses 604 to 606 for 2 Hz, 5 Hz, and 10 Hz be respectively L1, L2, and L3, and the angular velocity amplitudes for 2 Hz, 5 Hz, and 10 Hz be respectively δ1, δ2, and δ3. Then the composition ratio correcting unit 220 computes the rotation radius for correction using the following equation.

$$L = \frac{L1\delta1 + L2\delta2 + L3\delta3}{\delta1 + \delta2 + \delta3} \quad (8)$$

Figure 10B:
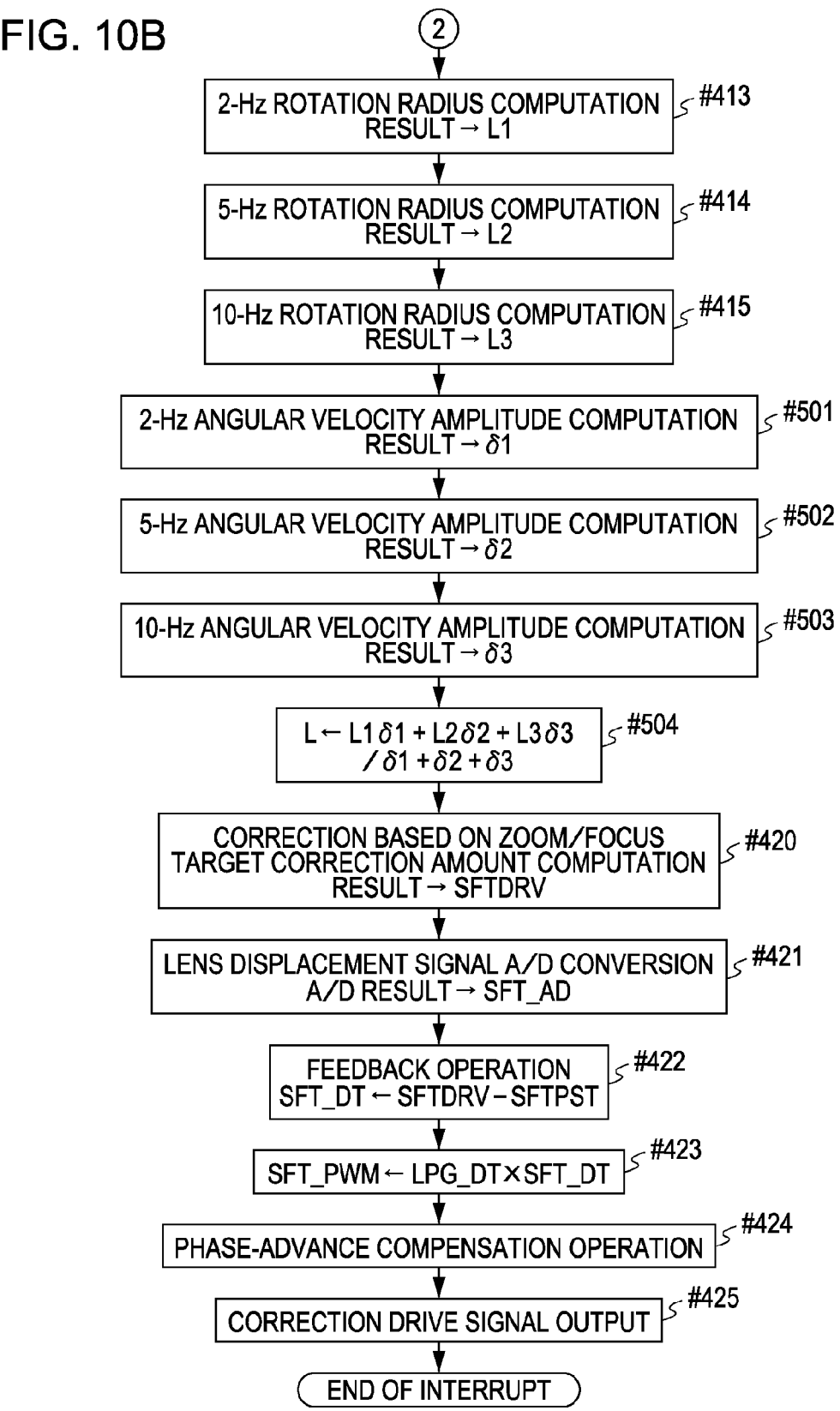
FIG. 10 is a flowchart for image shake correction.

FIG. 10 shows a flowchart for image shake correction according to the second embodiment. The major portion of the process is shown by steps #501 to #504, and the other portions, which are similar to the first embodiment, are denoted by the same step numbers, and the explanation thereof is omitted. In step #501, the amplitude δ1 of W_BPF2HZ_DAT is computed. In step #502, the amplitude δ2 of W_BPF5HZ_DAT is computed. In step #503, the amplitude δ3 of W_BPF10HZ_DAT is computed. In step #504, a rotation radius is computed using equation (8) in which a larger weight is assigned to a frequency corresponding to a larger angular velocity.

As described above, in the present embodiment, computation is performed using Equation (8) by assigning a larger weight to a rotation radius at a frequency corresponding to a larger angular velocity amplitude; however, the equation for weighting is not limited to Equation (8), and any equation may be used which assigns a larger weight to a rotation radius at a frequency corresponding to a larger angular velocity amplitude.

In the present embodiment, a weighting operation is performed by considering the amplitude of an angular velocity; however, since the present embodiment is to provide a function of decreasing a weight assigned to a rotation radius which has an unnaturally large computed value, weighting may be performed by considering the value of a rotation radius itself. In other words, a weighting operation may be performed by assigning a smaller weight to a large rotation radius than to a small rotation radius.

In the present embodiment, a weighting operation is performed by obtaining rotation radiuses at three different frequencies; however, the present embodiment can be realized in cases in which at least two rotation radiuses at two different frequencies are obtained and the reliability thereof is evaluated, thereby performing a weighting operation.

In the present embodiment, by assigning weights to respective rotation radiuses in accordance with the angular velocity amplitudes, high-accuracy image shake correction is realized even when a rotation radius at one of the frequencies becomes significantly large.

A third embodiment of the present invention will be explained. For simplicity, components that are the same as those of the first or second embodiments are denoted by the same reference numerals, the explanation thereof being omitted, and only portions specific to the present embodiment will be explained.

Figure 11:
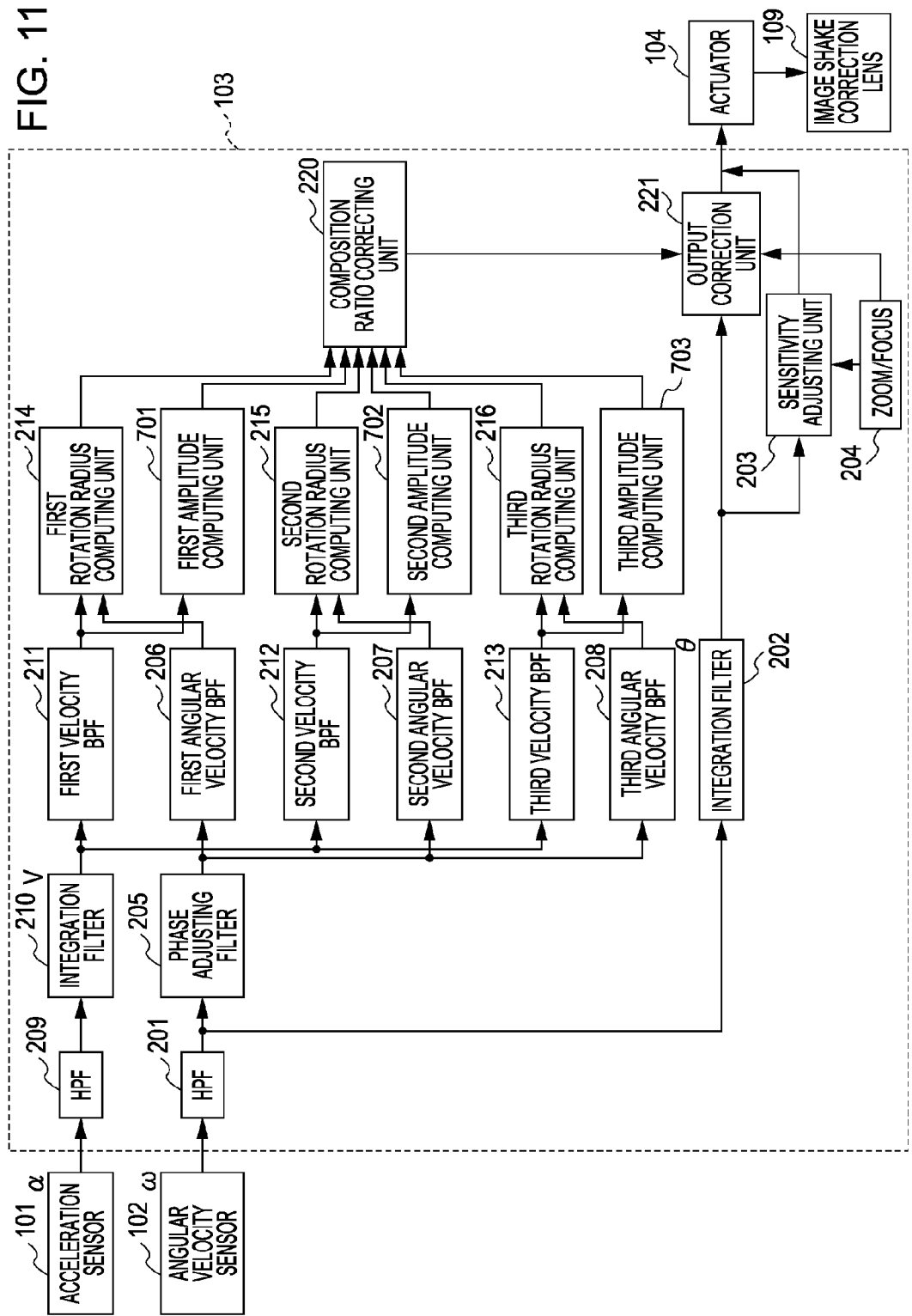
FIG. 11 is a block diagram for image shake correction.

The mechanical structure and hardware configuration of a camera in the present embodiment are the same as those in the first embodiment. FIG. 11 shows a block diagram according to the third embodiment of the present embodiment. The differences between the block diagrams of FIG. 8 and FIG. 11 are as follows.

(1) The signals input to the amplitude computing units 701 to 703 are changed from the angular velocity signals having been through BPFs to the velocity signals having been through BPFs.

(2) In the processing performed by the composition ratio correcting unit 220 in the second embodiment, a larger composition weight is assigned to a rotation radius corresponding to an angular velocity having a larger amplitude; however, in the present embodiment, a larger composition weight is assigned to a rotation radius corresponding to a velocity having a larger amplitude.

First, the reason for using velocity amplitudes to adjust the rotation radius composition ratio will be described. A rotation radius is computed using Equation (4). As can be seen from Equation (4), a rotation radius is proportional to a velocity. Hence, the higher a velocity is, the larger a shift shake amount is.

On the basis of what has been described above, a larger weight is assigned to a rotation radius at a frequency corresponding to a higher velocity in the present embodiment.

The method of computing amplitudes performed by the amplitude computing units 701 to 703 is basically the same as the above-described method of computing angular velocity amplitudes, the only difference being that the input has been changed from angular velocities to velocities.

The method for weighting operations performed by the composition ratio correcting unit 220 is also basically the same as that described above. The difference is that velocity amplitudes are used instead of angular velocity amplitudes.

Let the rotation radiuses 604 to 606 for 2 Hz, 5 Hz, and 10 Hz be respectively L1, L2, and L3, and the velocity amplitudes for 2 Hz, 5 Hz, and 10 Hz be respectively γ1, γ2, and γ3. Then the composition ratio correcting unit 220 computes a rotation radius for correction using the following equation.

$$L = \frac{L1\gamma1 + L2\gamma2 + L3\gamma3}{\gamma1 + \gamma2 + \gamma3} \quad (9)$$

Figure 12A:
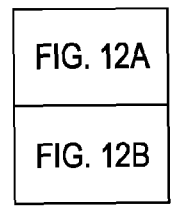
FIG. 12 is a flowchart for image shake correction.
Figure 12A:
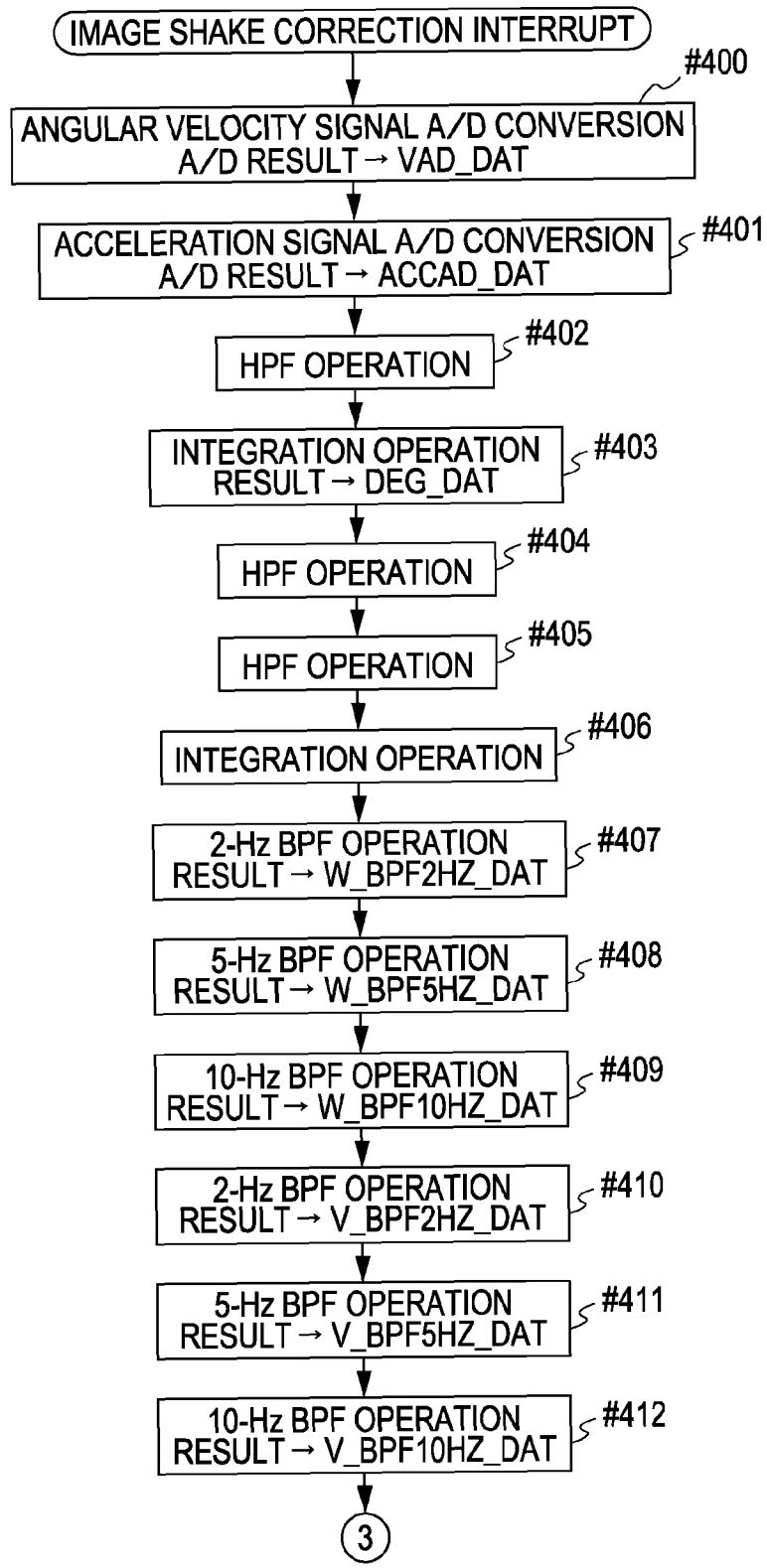
Figure 12B:
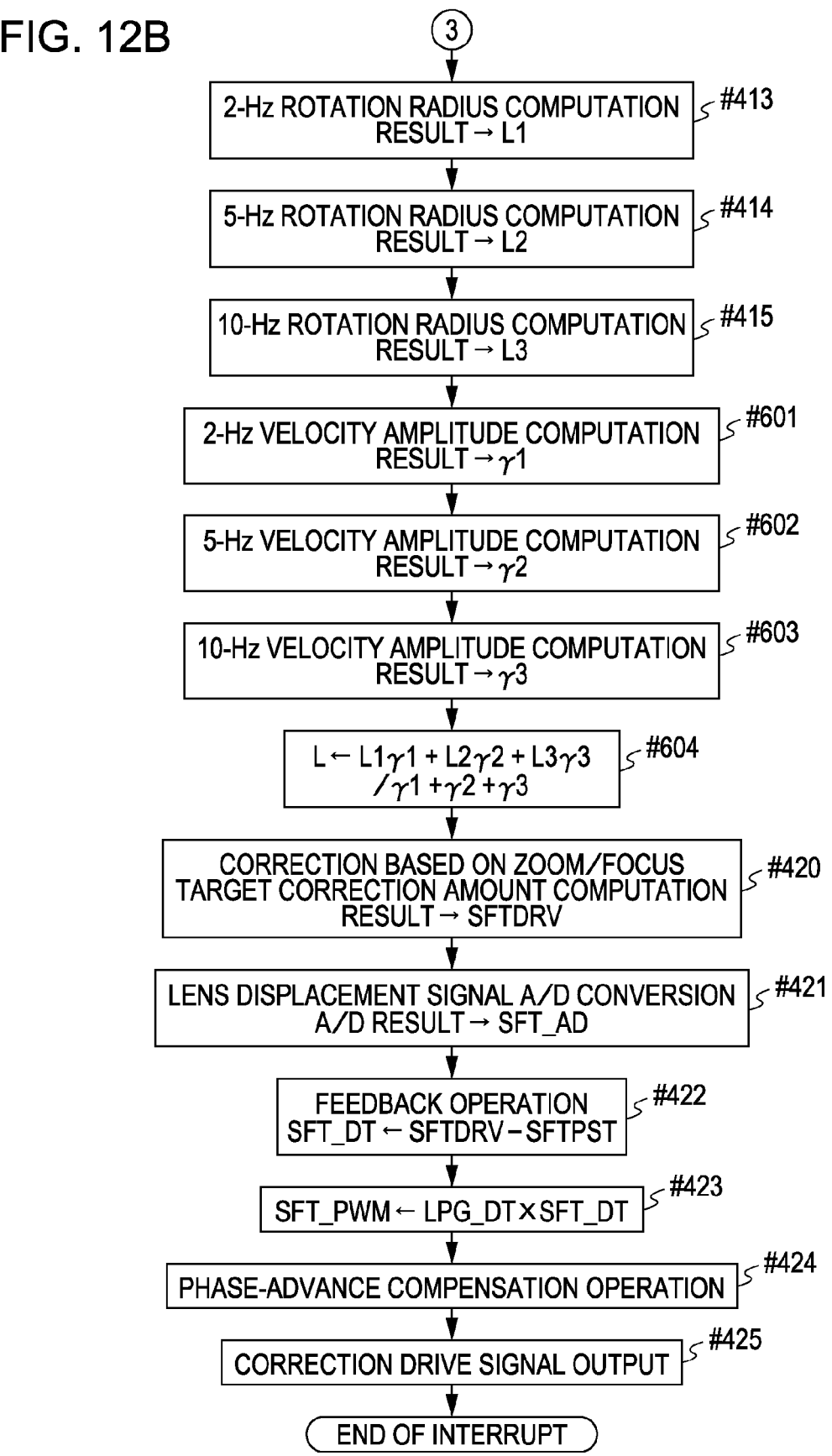

FIG. 12 shows a flowchart for image shake correction according to the third embodiment. The major portion of the process is shown by steps #601 to #604, and the other portions, which are similar to the first embodiment, are denoted by the same step numbers, and the explanation thereof is omitted. In step #601, the amplitude γ1 of V_BPF2HZ_DAT is computed. In step #602, the amplitude γ2 of V_BPF5HZ_DAT is computed. In step #603, the amplitude γ3 of V_BPF10HZ_DAT is computed. In step #604, a rotation radius is computed using equation (9) in which a larger weight is assigned to a frequency corresponding to a larger velocity.

As described above, in the present embodiment, computation is performed by assigning a larger weight to a rotation radius at a frequency corresponding to a larger velocity amplitude; however, the equation for weighting is not limited to Equation (9), and any equation may be used which assigns a larger weight to a rotation radius at a frequency corresponding to larger velocity amplitude.

In the present embodiment, a weighting operation is performed by obtaining rotation radiuses at three different frequencies; however, the present embodiment can be realized in cases in which at least two rotation radiuses at two different frequencies are obtained.

In the present embodiment, by assigning weights to respective rotation radiuses in accordance with the velocity amplitudes, it is possible to perform a weighting operation taking into consideration substantial shift shake. This is because, in the first place, the output of an acceleration sensor is detecting only a shift shake component among shake components. In other words, shake having a small amplitude is thought to be affected little by shift shake in the first place.

The evaluation indexes used to evaluate the reliability of the value of a rotation radius are not limited to those described above in the three embodiments, and may be any index based on the output of at least one of an angular velocity sensor and an acceleration sensor. In particular, the present invention can be applied to cases which are thought to use indexes, similar to the present invention, substantially based on the difference between the phases of an angular velocity and a velocity (or acceleration), an angular velocity amplitude, a velocity amplitude, or the like. A further increase in correction accuracy is possible by combining the above-described three evaluation methods or other evaluation methods with each of the embodiments.

In the embodiments, an interchangeable lens provided in a single-lens reflex camera has been described as an example of an apparatus having an image shake correction capability. However, the present invention, which can be implemented as a compact and high-performance system, is applicable to a digital compact camera, a video camera, a monitor camera, a web camera, a built-in camera function of a cellular phone, and the like.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-222017 filed Aug. 29, 2008, which is hereby incorporated by reference herein in its entirety.

What is claimed is:

1. An apparatus comprising:
   an angular velocity detecting unit configured to detect an angular velocity of the apparatus;
   an acceleration detecting unit configured to detect acceleration of the apparatus;
   a determining unit configured to determine a correction amount to correct an image shake; and
   a correcting unit configured to correct the image shake based on the correction amount,
   wherein the determining unit is configured to obtain an output from the angular velocity detecting unit and an output from the acceleration detecting unit at a plurality of different frequencies, and determine the correction amount based on information for a plurality of rotation radius of the image shake, which the rotation radius respectively differs in each of the frequencies, and the output from the angular velocity detecting unit and the output from the acceleration detecting unit.

2. The apparatus according to claim 1 further comprising:
   band extracting units configured to extract signals of different frequency components from outputs from the angular velocity detecting unit and the acceleration detecting unit;
   wherein the determining unit obtains the respective rotation radius for each of different frequencies obtained based on outputs from the band extracting units and determines the correction amount based on a result of assigning a respective weight to the rotation radius at each of the plurality of the frequencies based on information regarding at least one of the angular velocity and the acceleration and combining the rotation radius to which the respective weight is assigned.

3. The apparatus according to claim 2, wherein the determining unit determines a velocity of the apparatus based on information regarding the acceleration, and obtains the respective rotation radius from a respective ratio of the angular velocity and the velocity at each of the plurality of the frequencies.

4. The apparatus according to claim 3, wherein the determining unit determines the correction amount based on the result of assigning weights to the respective rotation radiuses at the plurality of the frequencies such that a rotation radius for which there is a small phase difference between the angular velocity and the velocity is assigned a weight that is larger than that assigned to a rotation radius for which there is a large phase difference.

5. The apparatus according to claim 3, wherein the determining unit determines the correction amount based on the result of assigning weights to the respective rotation radiuses at the plurality of the frequencies such that a rotation radius corresponding to the velocity having a large amplitude is assigned a weight that is larger than that assigned to a rotation radius corresponding to the velocity having a small amplitude.

6. The apparatus according to claim 3, wherein the determining unit determines the respective rotation radius at each of the plurality of the frequencies based on a plurality of pairs of the angular velocities and the velocities.

7. The apparatus according to claim 2, wherein the determining unit determines the correction amount based on the result of assigning weights to the respective rotation radiuses at the plurality of the frequencies such that a rotation radius corresponding to the angular velocity having a large amplitude is assigned a weight that is larger than that assigned to a rotation radius corresponding to the angular velocity having a small amplitude.

8. A method of controlling an apparatus comprising:
   detecting an angular velocity of the apparatus by an angular velocity detecting unit;
   detecting an acceleration of the apparatus by an acceleration detecting unit;
   determining a correction amount to correct an image shake;
   correcting the image shake based on the correction amount;
   wherein the correction amount is determined based on information for a plurality of rotation radius of the image shake, which the rotation radius respectively differs in each of the frequencies, and an output from the angular velocity detecting unit and an output from the acceleration detecting unit.

9. The method according to claim 8, further comprising:
   extracting different frequency components from the detected angular velocity and the detected acceleration;
   obtaining the respective rotation radius at each of a plurality of different frequencies;
   assigning a respective weight to the rotation radius at each of the plurality of the frequencies based on information regarding at least one of the angular velocity and the acceleration.

10. The method according to claim 9, wherein in the weight assigning, weights are assigned to the respective rotation radiuses at the plurality of the frequencies such that a rotation radius corresponding to the angular velocity having a large amplitude is assigned a weight that is larger than that assigned to a rotation radius corresponding to the angular velocity having a small amplitude.

11. The method according to claim 9, further comprising obtaining a velocity of the apparatus based on information of the acceleration, wherein in the rotation radius obtaining, the respective rotation radius is obtained from a respective ratio of the angular velocity and the velocity at each of the plurality of the frequencies.

12. The method according to claim 11, wherein in the weight assigning, weights are assigned to the respective rotation radiuses at the plurality of the frequencies such that a rotation radius for which there is a small phase difference between the angular velocity and the velocity is assigned a weight that is larger than that assigned to a rotation radius for which there is a large phase difference.

13. The method according to claim 11, wherein in the weight assigning, weights are assigned to the respective rotation radiuses at the plurality of the frequencies such that a rotation radius corresponding to the velocity having a large amplitude is assigned a weight that is larger than that assigned to a rotation radius corresponding to the velocity having a small amplitude.

14. The method according to claim 11, wherein in the rotation radius obtaining, the respective rotation radius at each of the plurality of the frequencies determined based on a plurality of pairs of the angular velocities and the velocities are obtained.

15. An image shake correction apparatus used for an optical apparatus, the image shake correction apparatus comprising:
 a determining unit configured to determine a correction amount to correct an image shake; and
 a correcting unit configured to correct the image shake based on the correction amount,
 wherein the determining unit is configured to obtain an output from an angular velocity detecting unit and an output from an acceleration detecting unit at a plurality of different frequencies, and determine the correction amount based on information for a plurality of rotation radius of the image shake, which the rotation radius respectively differs in each of the frequencies, and the output from the angular velocity detecting unit and the output from the acceleration detecting unit.

16. The image shake correction apparatus according to claim 15,
 wherein the determining unit obtains the respective rotation radius for each of different frequencies based on signals of different frequency components extracted from outputs from the angular velocity detecting unit and the acceleration detecting unit and determines the correction amount based on a result of assigning a respective weight to the rotation radius at each of the plurality of the frequencies based on information regarding at least one of the angular velocity and the acceleration and combining the rotation radius to which the respective weight is assigned.

17. The image shake correction apparatus according to claim 16, wherein the determining unit determines a velocity of the apparatus based on information regarding the acceleration, and obtains the respective rotation radius from a respective ratio of the angular velocity and the velocity at each of the plurality of the frequencies.

18. The image shake correction apparatus according to claim 17, wherein the determining unit determines the correction amount based on the result of assigning weights to the respective rotation radiuses at the plurality of the frequencies such that a rotation radius for which there is a small phase difference between the angular velocity and the velocity is assigned a weight that is larger than that assigned to a rotation radius for which there is a large phase difference.

19. The image shake correction apparatus according to claim 17, wherein the determining unit determines the correction amount based on the result of assigning weights to the respective rotation radiuses at the plurality of the frequencies such that a rotation radius corresponding to the velocity having a large amplitude is assigned a weight that is larger than that assigned to a rotation radius corresponding to the velocity having a small amplitude.

20. The image shake correction apparatus according to claim 17, wherein the determining unit determines the respective rotation radius at each of the plurality of the frequencies based on a plurality of pairs of the angular velocities and the velocities.

21. The image shake correction apparatus according to claim 16, wherein the determining unit determines the correction amount based on the result of assigning weights to the respective rotation radiuses at the plurality of the frequencies such that a rotation radius corresponding to the angular velocity having a large amplitude is assigned a weight that is larger than that assigned to a rotation radius corresponding to the angular velocity having a small amplitude.

22. An apparatus comprising:
 an angular velocity detecting unit configured to detect an angular velocity of the apparatus;
 an acceleration detecting unit configured to detect acceleration of the apparatus;
 a determining unit configured to determine a correction amount to correct an image shake; and
 a correcting unit configured to correct the image shake based on the correction amount,
 wherein the determining unit is configured to obtain an output from the angular velocity detecting unit and an output from the acceleration detecting unit at a plurality of different frequencies, and determine the correction amount based on a result of assigning a respective weight to rotation radius at each of the plurality of the frequencies, and the output from the angular velocity detecting unit and the output from the acceleration detecting unit.

23. A method of controlling an apparatus comprising:
 detecting an angular velocity of the apparatus by an angular velocity detecting unit;
 detecting an acceleration of the apparatus by an acceleration detecting unit;
 determining a correction amount to correct an image shake;
 correcting the image shake based on the correction amount;
 wherein the correction amount is determined based on a result of assigning a respective weight to rotation radius at each of the plurality of the frequencies, and an output from the angular velocity detecting unit and an output from the acceleration detecting unit.

24. An image shake correction apparatus used for an optical apparatus, the image shake correction apparatus comprising:
 a determining unit configured to determine a correction amount to correct an image shake; and
 a correcting unit configured to correct the image shake based on the correction amount,
 wherein the determining unit is configured to obtain an output from an angular velocity detecting unit and an output from an acceleration detecting unit at a plurality of different frequencies, and determine the correction amount based on a result of assigning a respective weight to rotation radius at each of the plurality of the frequencies, and the output from the angular velocity detecting unit and the output from the acceleration detecting unit.

* * * * *